US011881165B2

(12) United States Patent
Pyun et al.

(10) Patent No.: US 11,881,165 B2
(45) Date of Patent: Jan. 23, 2024

(54) DISPLAY DEVICE

(71) Applicant: Samsung Display Co., Ltd., Yongin-Si (KR)

(72) Inventors: Ki Hyun Pyun, Yongin-si (KR); Hee Sook Park, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 260 days.

(21) Appl. No.: 17/511,620

(22) Filed: Oct. 27, 2021

(65) Prior Publication Data

US 2022/0051624 A1 Feb. 17, 2022

Related U.S. Application Data

(63) Continuation of application No. 17/036,765, filed on Sep. 29, 2020, now Pat. No. 11,189,226.

(30) Foreign Application Priority Data

Feb. 20, 2020 (KR) ........................ 10-2020-0021277

(51) Int. Cl.
*G09G 3/3233* (2016.01)

(52) U.S. Cl.
CPC ....... *G09G 3/3233* (2013.01); *G09G 2310/08* (2013.01); *G09G 2320/029* (2013.01); *G09G 2320/0247* (2013.01); *G09G 2320/0257* (2013.01); *G09G 2320/0626* (2013.01); *G09G 2320/0653* (2013.01); *G09G 2320/103* (2013.01); *G09G 2330/021* (2013.01)

(58) Field of Classification Search
CPC .......... G09G 2320/0247; G09G 2320/10–106; G09G 2320/0626–0653; G09G 2320/029–0295; G09G 2330/00–12; G09G 2320/0295; G09G 2320/045–048
See application file for complete search history.

(56) References Cited

U.S. PATENT DOCUMENTS

| | | | | |
|---|---|---|---|---|
| 6,583,775 B1 | 6/2003 | Sekiya et al. | |
| 6,859,193 B1 | 2/2005 | Yumoto | |
| 6,975,290 B2 | 12/2005 | Asano | |
| 7,565,629 B2 | 7/2009 | Ikemoto | |
| 9,318,046 B2 * | 4/2016 | Xie | G09G 3/3225 |
| 9,653,024 B1 * | 5/2017 | Kuo | G09G 3/3258 |
| 10,176,756 B2 * | 1/2019 | Hwang | G09G 3/3275 |
| 10,311,786 B2 * | 6/2019 | Oh | G09G 3/3225 |
| 10,510,292 B2 * | 12/2019 | Jang | G09G 3/3258 |

(Continued)

FOREIGN PATENT DOCUMENTS

| | | |
|---|---|---|
| KR | 10-0619609 B1 | 9/2006 |
| KR | 10-0731726 B1 | 6/2007 |

(Continued)

*Primary Examiner* — Patrick F Marinelli
(74) *Attorney, Agent, or Firm* — Innovation Counsel LLP

(57) ABSTRACT

The present disclosure provides a display device. The display device includes a gain provider for gradually decreasing a gain value from a first time when a first period elapses from a time at which an enable signal is generated, and a plurality of pixels for receiving data voltages determined by the gain value and the input grayscale values. The gain provider determines a length of the first period according to a first load value based on the input grayscale values at the time at which the enable signal is generated.

22 Claims, 16 Drawing Sheets

(56) References Cited

U.S. PATENT DOCUMENTS

| | | | | |
|---|---|---|---|---|
| 10,510,320 | B2 * | 12/2019 | Kang | G06F 3/1446 |
| 10,529,275 | B2 * | 1/2020 | Song | G09G 3/2096 |
| 10,665,200 | B2 * | 5/2020 | Pyun | G09G 3/3258 |
| 10,706,774 | B2 * | 7/2020 | Lee | H04N 5/57 |
| 10,796,629 | B2 * | 10/2020 | Omid-Zohoor | G09G 3/32 |
| 11,189,226 | B2 * | 11/2021 | Pyun | G09G 3/3233 |
| 11,244,600 | B2 * | 2/2022 | Pyun | G09G 3/3233 |
| 11,395,388 | B1 * | 7/2022 | Han | H05B 45/30 |
| 11,514,849 | B2 * | 11/2022 | Pyun | G09G 3/3233 |
| 2002/0180812 | A1 * | 12/2002 | Kim | G09G 5/14 715/856 |
| 2004/0263444 | A1 * | 12/2004 | Kimura | G09G 3/3266 345/82 |
| 2006/0125715 | A1 | 6/2006 | Choi | |
| 2008/0284702 | A1 | 11/2008 | Shidara et al. | |
| 2009/0201281 | A1 * | 8/2009 | Routley | G09G 3/3233 345/82 |
| 2010/0060554 | A1 | 3/2010 | Koh et al. | |
| 2010/0265280 | A1 * | 10/2010 | Yen | G09G 3/3406 345/691 |
| 2011/0025676 | A1 * | 2/2011 | Kawashima | G09G 3/3233 345/82 |
| 2013/0002737 | A1 * | 1/2013 | Yen | G09G 3/3406 345/691 |
| 2016/0155382 | A1 * | 6/2016 | Cheon | G09G 3/3258 345/76 |
| 2018/0047335 | A1 * | 2/2018 | Hwang | G09G 3/3266 |
| 2018/0122300 | A1 * | 5/2018 | Jang | G09G 3/3258 |
| 2018/0137839 | A1 * | 5/2018 | Kang | G06F 3/1446 |
| 2019/0057652 | A1 * | 2/2019 | Lee | H04N 5/57 |
| 2019/0088199 | A1 * | 3/2019 | Zhang | G09G 3/3233 |
| 2019/0088204 | A1 * | 3/2019 | Zhang | G09G 3/3258 |
| 2019/0088205 | A1 * | 3/2019 | Zhang | G09G 3/3233 |
| 2019/0213953 | A1 * | 7/2019 | Koh | G09G 3/3225 |
| 2019/0295462 | A1 * | 9/2019 | Song | G09G 3/2096 |
| 2020/0043402 | A1 * | 2/2020 | Omid-Zohoor | G09G 3/3648 |
| 2020/0043437 | A1 * | 2/2020 | Pyun | G09G 3/20 |
| 2020/0066199 | A1 * | 2/2020 | Song | G09G 3/3208 |
| 2020/0143751 | A1 * | 5/2020 | Byun | G09G 3/3233 |
| 2020/0251045 | A1 * | 8/2020 | An | H02H 1/0007 |
| 2021/0012704 | A1 * | 1/2021 | Pyun | G09G 3/32 |
| 2021/0264877 | A1 * | 8/2021 | Pyun | G09G 3/3233 |
| 2022/0051624 | A1 * | 2/2022 | Pyun | G09G 3/3233 |
| 2022/0157232 | A1 * | 5/2022 | Pyun | G09G 3/32 |

FOREIGN PATENT DOCUMENTS

| | | | |
|---|---|---|---|
| KR | 10-0861756 | B1 | 10/2008 |
| KR | 10-0888004 | B1 | 3/2009 |
| KR | 10-0888558 | B1 | 3/2009 |
| KR | 10-1017186 | B1 | 2/2011 |

* cited by examiner

<PATTERN "B">

DISPLAY DEVICE

CROSS-REFERENCE TO RELATED APPLICATION(S)

The present application is a continuation application of U.S. patent application Ser. No. 17/036,765 filed on Sep. 29, 2020, which claims priority under 35 USC § 119 to Korean patent application 10-2020-0021277 filed on Feb. 20, 2020, in the Korean Intellectual Property Office, the disclosures of which are incorporated herein in their entirety by reference.

BACKGROUND

1. Technical Field

Generally, the present disclosure generally relates to a display device. More particularly, the present disclosure relates to a display device capable of reducing a flicker according to an image pattern while using a screen saver function.

2. Related Art

With the development of information technologies, the importance of a display device which is a connection medium between a user and information increases. Accordingly, display devices such as a liquid crystal display device, an organic light emitting display device, and a plasma display device are increasingly used.

A display device may include a plurality of pixels, and display a frame through a combination of lights emitted from the pixels. When a plurality of frames are sequentially displayed, a user may recognize the frames as an image (moving image or still image).

When a still image is displayed, occurrence of an afterimage can be prevented and power consumption can be reduced, by using a screen saver function of decreasing a luminance of an image. However, it is necessary to increase the luminance of the image again when the still image is changed to a moving image, and a flicker occurs according to an image pattern. Thus, there is need to develop a novel display device to increase display quality and reduce power consumption.

SUMMARY

The present embodiments provide a display device capable of reducing a flicker according to an image pattern while using a screen saver function.

In accordance with an aspect of the present disclosure, there is provided a display device including a gain provider configured to gradually decrease a gain value from a first time when a first period elapses from a time at which an enable signal is generated, and a plurality of pixels configured to receive data voltages determined by the gain value and the input grayscale values, wherein the gain provider determines a length of the first period according to a first load value based on input grayscale values at the time at which the enable signal is generated.

The gain provider may determine the first period to become shorter as the first load value becomes smaller.

The gain provider may maintain the gain value from a second time after the first time.

An interval between the time at which the enable signal is generated and the second time may be set constant regardless of the first load value.

An interval between the time at which the enable signal is generated and the second time may be set longer as the first load value becomes smaller.

The gain provider may include a load comparator configured to generate the enable signal when a difference between a load value of a first frame and a load value of a second frame is smaller than an enable threshold value, a first frame counter configured to provide a first count value of frames from the time at which the enable signal is generated, and a set gain controller configured to determine the first period, based on the first load value and the first count value.

The set gain controller may include a plurality of set gain lookup tables different from each other according to the first load value.

The set gain controller may provide a first gain ratio value corresponding to the first count value with reference to a set gain lookup table selected according to the first load value.

The display device may further include a current sensor configured to provide a sensing value of a current flowing in a first power line, and an initial gain provider configured to provide an initial gain value, based on the sensing value. The first power line may be commonly coupled to the pixels. The gain provider further may include a gain converter configured to convert the initial gain value into the gain value according to the first gain ratio value.

The initial gain provider may provide the initial gain value such that the sensing value is smaller than a current limit value. The first gain ratio value may be equal to 1 or less than 1.

The gain provider may gradually increase the gain value from a third time after the second time.

The gain provider may determine an increase rate of the gain value according to a second load value based on the input grayscale values at the third time.

The gain provider may determine an increase rate of the gain value according to a difference between the second load value and the first load value.

The load comparator may generate a disable signal when a difference between a load value of a third frame and a load value of a fourth frame is greater than a disable threshold value. The gain provider may include a second frame counter configured to provide a second count value of frames from a time at which the disable signal is generated, and a reset gain controller configured to determine the increase rate based on the second load value and the second count value.

The reset gain controller may include a plurality of reset gain lookup tables different from each other according to the second load value.

The reset gain controller may provide a second gain ratio value corresponding to the second count value with reference to a reset gain lookup table selected according to the second load value.

The gain converter may convert the initial gain value into the gain value according to the second gain ratio value. The second gain ratio value may be equal to 1 or less than 1.

In accordance with another aspect of the present disclosure, there is provided a display device including a plurality of pixels commonly coupled to a first power line and a current sensor configured to provide a sensing value of a current flowing in the first power line, wherein the pixels gradually decreases a luminance of a still image from a first time, while the still image is being displayed, wherein the first time is a time when a first period elapses from a time at which the display of the still image is started, and wherein a length of the first period is changed depending on the sensing value at the time at which the display of the still image is started.

The first period may become shorter as the sensing value becomes smaller.

The plurality of pixels may maintain the luminance of the still image from a second time after the first time. An interval between the time at which the display of the still image is started and the second time may be set longer as the sensing value at the time at which the display of the still image is started becomes smaller.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
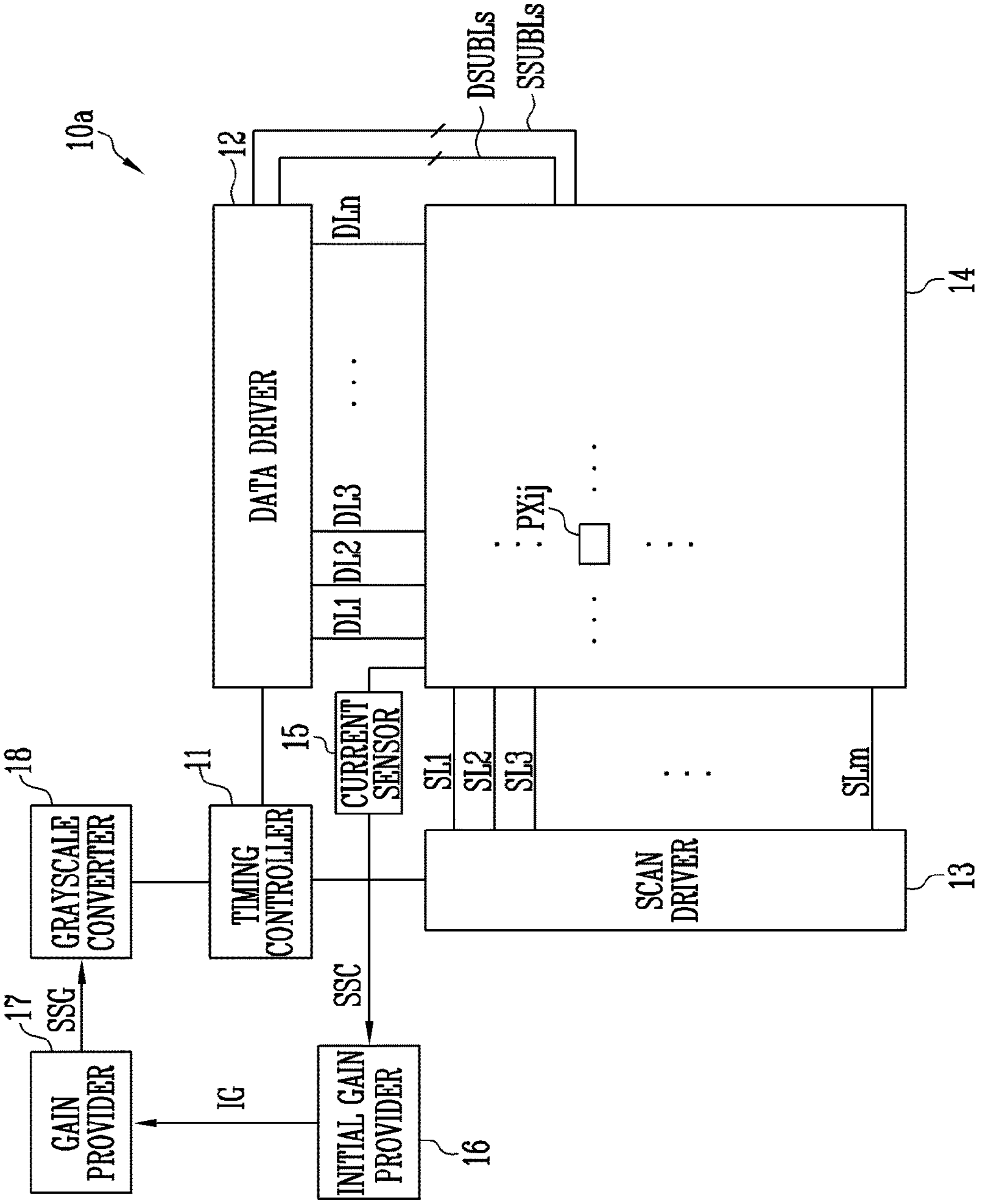
FIG. 1 is a diagram illustrating a display device in accordance with an embodiment of the present disclosure.

Hereinafter, example embodiments are described in detail with reference to the accompanying drawings so that those skilled in the art may easily practice the present disclosure. The present disclosure may be implemented in various different forms and is not limited to the example embodiments described in the present specification.

A part irrelevant to the description will be omitted to clearly describe the present disclosure, and the same or similar constituent elements will be designated by the same reference numerals throughout the specification. Therefore, the same reference numerals may be used in different drawings to identify the same or similar elements.

In addition, the size and thickness of each component illustrated in the drawings are arbitrarily shown for better understanding and ease of description, but the present disclosure is not limited thereto. Thicknesses of several portions and regions are exaggerated for clear expressions.

FIG. 1 is a diagram illustrating a display device in accordance with an embodiment of the present disclosure.

Referring to FIG. 1, the display device 10_a_ in accordance with the embodiment of the present disclosure may include a timing controller 11, a data driver 12, a scan driver 13, a pixel unit 14, a current sensor 15, an initial gain provider 16, a gain provider 17, and a grayscale converter 18.

The timing controller 11 may receive input grayscale values for each frame and control signals from an external processor.

The grayscale converter 18 may convert input grayscale values into output grayscale values, based on a gain value. For example, the gain value SSG may be a value of greater or equal to 0 and less or equal to 1, and an output grayscale value may be calculated by multiplying an input grayscale value and the gain value. The output grayscale value may be smaller than or equal to the input grayscale value. The gain value SSG may be a value of greater or equal to 0% or less or equal to 100%. In addition, a method of expressing the gain value SSG may be various.

The timing controller 11 may provide output grayscale values to the data driver 12. Also, the timing controller 11 may provide the data driver 12, the scan driver 13, or the like with control signals suitable for specifications of the data driver 12, the scan driver 13, or the like for the purpose of frame display.

The data driver 12 may convert output grayscale values into data voltages. The data driver 12 may generate data voltages to a plurality of data lines DL1, DL2, DL3, . . . , and DLn by using output grayscale values and control signals. For example, the data driver 12 may sample output grayscale values by using a clock signal, and apply data voltages corresponding to the output grayscale values to the data lines from DL1 to DLn in a unit of a pixel row. The pixel row may mean pixels coupled to the same scan line. Here, n may be an integer greater than 0. The data driver 12 may be a group of a plurality of driver units. The display device 10_a_ may include a plurality of data drivers as driver units are grouped. Arrangements of driver units will be described with reference to subsequent drawings.

The scan driver 13 may generate scan signals to be provided to scan lines SL1, SL2, SL3, . . . , and SLm by receiving a clock signal, a scan start signal, and the like from the timing controller 11. Here, m may be an integer greater than 0.

The scan driver 13 may sequentially supply scan signals having a pulse of a turn-on level to the scan lines from SL1 to SLm. The scan driver 13 may include scan stages configured in the form of shift registers. The scan driver 13 may generate scan signals in a manner that sequentially transfers the scan start signal in the form of a pulse of a turn-on level to a next scan stage under the control of the clock signal.

The pixel unit 14 includes a plurality of pixels. Each pixel PXij may be coupled to a corresponding data line and a corresponding scan line. Here, i and j may be integers greater than 0. The pixel PXij may indicate a pixel in which a scan transistor is coupled to an ith scan line and a jth data line. The pixels may be commonly coupled to a first power line (not shown) and a second power line (not shown).

The pixels may receive data voltages determined according to the gain value SSG and input grayscale values. For example, a first data voltage is determined based on a first input grayscale value and a first gain value. In addition, a second data voltage is determined based on a second input grayscale value and a second gain value. When the first input grayscale value and the second input grayscale value are the same, and the first gain value is greater than the second gain value, the first data voltage may be higher than the second data voltage. This is when a driving transistor (e.g., a first transistor T1 shown in FIG. 2) of the pixel is configured as an N-type transistor. When the driving transistor is configured as a P-type transistor, the first data voltage may be lower than the second data voltage.

The first power line may be coupled to first power sub-lines DSUBLs. The first power sub-lines DSUBLs may be coupled to corresponding first power sources (not shown). In this embodiment, the data driver 12 may include first power sources. Therefore, the first power sub-lines DSUBLs may be coupled to the data driver 12. In another embodiment, the data driver 12 and the first power sources may be configured separately from each other. For example, the first power sources may be coupled directly to a Power Management Integrated Circuit (PMIC) instead of the data driver 12. The first power sub-lines DSUBLs may not be coupled to the data driver 12.

The second power line may be coupled to second sub-power lines SSUBLs. The second sub-power lines SSUBLs may be coupled to corresponding second power sources (not shown). In this embodiment, the data driver 12 may include second power sources. Therefore, the second sub-power lines SSUBLs may be coupled to the data driver 12. In an embodiment, the data driver 12 and the second power sources may be configured separately from each other. For example, the second power sources may be coupled directly to a PMIC instead of the data driver 12. The second power sub-lines SSUBLs may not be coupled to the data driver 12.

The current sensor 15 may be coupled to the first power line. The current sensor 15 may provide a sensing value SSC of a current flowing in the first power line. The current sensor 15 does not measure branch currents branching off to the respective pixels, but may measure a global current before the global current braches off to the pixels. The global current may corresponds to a sum of the branch currents.

In another embodiment, the current sensor 15 may be coupled to the second power line. The current sensor 15 may provide a sensing value SSC of a current flowing in the second power line. The current sensor 15 does not measure branch currents of the pixels, but may measure a global current obtained by adding up the branch currents. The global current may corresponds to a sum of the branch currents.

The initial gain provider 16 may provide an initial gain value IG, based on the sensing value SSC. The initial gain value IG may be a value of greater or equal to 0 or less or equal to 1. The initial gain value IG may be a value of greater or equal to 0% or less or equal to 100%. In addition, a method of expressing the initial gain value IG may be various.

The initial gain provider 16 may provide the initial gain value IG such that the sensing value SSC is smaller than a current limit value. The initial gain provider 16 controls the initial gain value IG such that the global current does not exceed the current limit value, to apply a primary limit such that the display device 10*a* does not excessively consume power.

The gain provider 17 may provide a gain value SSG, based on the initial gain value IG. The gain provider 17 may apply a secondary limit such that power consumption can be reduced when the display device 10*a* performs a screen saver function. Therefore, the gain value SSG may be smaller than or equal to the initial gain value IG.

Figure 2:
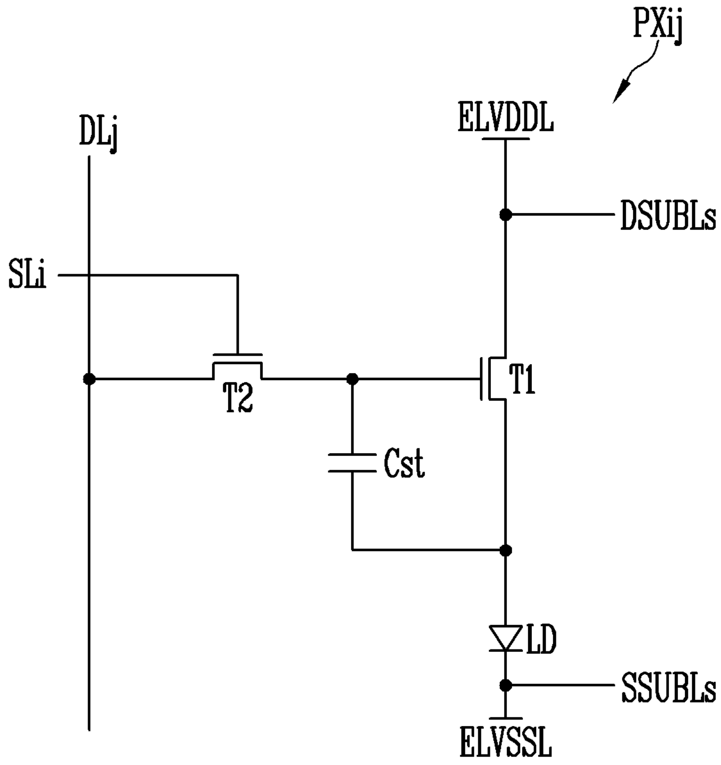
FIG. 2 is a diagram illustrating a pixel in accordance with an embodiment of the present disclosure.

FIG. 2 is a diagram illustrating a pixel in accordance with an embodiment of the present disclosure.

Referring to FIG. 2, the pixel PXij may include a first transistor T1, a second transistor T2, a storage capacitor Cst, and a light emitting diode LD.

Hereinafter, a circuit implemented with a P-type transistor is described as an example. However, those skilled in the art may design a circuit implemented with an N-type transistor by changing the polarity of a voltage applied to a gate terminal. Similarly, those skilled in the art may design a circuit implemented with a combination of the P-type transistor and the N-type transistor. The P-type transistor refers to a transistor in which an amount of current flowing when the difference in voltage between a gate electrode and a source electrode increases in a negative direction increases. The N-type transistor refers to a transistor in which an amount of current flowing when the difference in voltage between a gate electrode and a source electrode increases in a positive direction increases. The transistor may be configured in various forms including a Thin Film Transistor (TFT), a Field Effect Transistor (FET), a Bipolar Junction Transistor (BJT), and the like.

A gate electrode of the first transistor T1 may be coupled to a first electrode of the storage capacitor Cst, a first electrode of the first transistor T1 may be coupled to a first power line ELVDDL, and a second electrode of the first transistor T1 may be coupled to a second electrode of the storage capacitor Cst. The first transistor T1 may be referred to as a driving transistor.

A gate electrode of the second transistor T2 may be coupled to an ith scan line SLi, a first electrode of the second transistor T2 may be coupled to a jth data line DLj, and a second electrode of the second transistor T2 may be coupled to the gate electrode of the first transistor T1. The second transistor T2 may be referred to as a scan transistor.

An anode of the light emitting diode LD may be coupled to the second electrode of the first transistor T1, and a cathode of the light emitting diode LD may be coupled to a second power line ELVSSL. The light emitting diode LD may be configured as an organic light emitting diode, an inorganic light emitting diode, a quantum dot light emitting diode, or the like.

A first power voltage may be applied to the first power line ELVDDL, and a second power voltage may be applied to the second power line ELVSSL.

When a scan signal having a turn-on level (here, a high level) is applied through the scan line SLi, the second transistor T2 is in a turn-on state. A data voltage applied to the data line DLj is stored in the first electrode of the storage capacitor Cst.

A positive driving current (branch current) corresponding to a difference in voltage between the first electrode and the second electrode of the storage capacitor Cst flows between the first electrode and the second electrode of the first transistor T1. Accordingly, the light emitting diode LD emits light with a luminance corresponding to the data voltage.

Next, when a scan signal having a turn-off level (here, a low level) is applied through the scan line SLi, the second transistor T2 is turned off, and the data line DLj and the first electrode of the storage capacitor Cst is electrically decoupled from each other. Therefore, although the data voltage of the data line DLj is changed, the voltage stored in the first electrode of the storage capacitor Cst is not changed.

Embodiments may be applied not only the pixel PXij shown in FIG. 2 but also a pixel of another circuit.

First sub-power lines DSUBLs may be commonly coupled to the first power line ELVDDL. That is, electrical nodes of the first power line ELVDDL and the first power sub-lines DSUBLs may be the same.

Second power sub-lines SSUBLs may be commonly coupled to the second power line ELVSSL. That is, electrical nodes of the second power line ELVSSL and the second power sub-lines SSUBLs may be the same.

Figure 3:
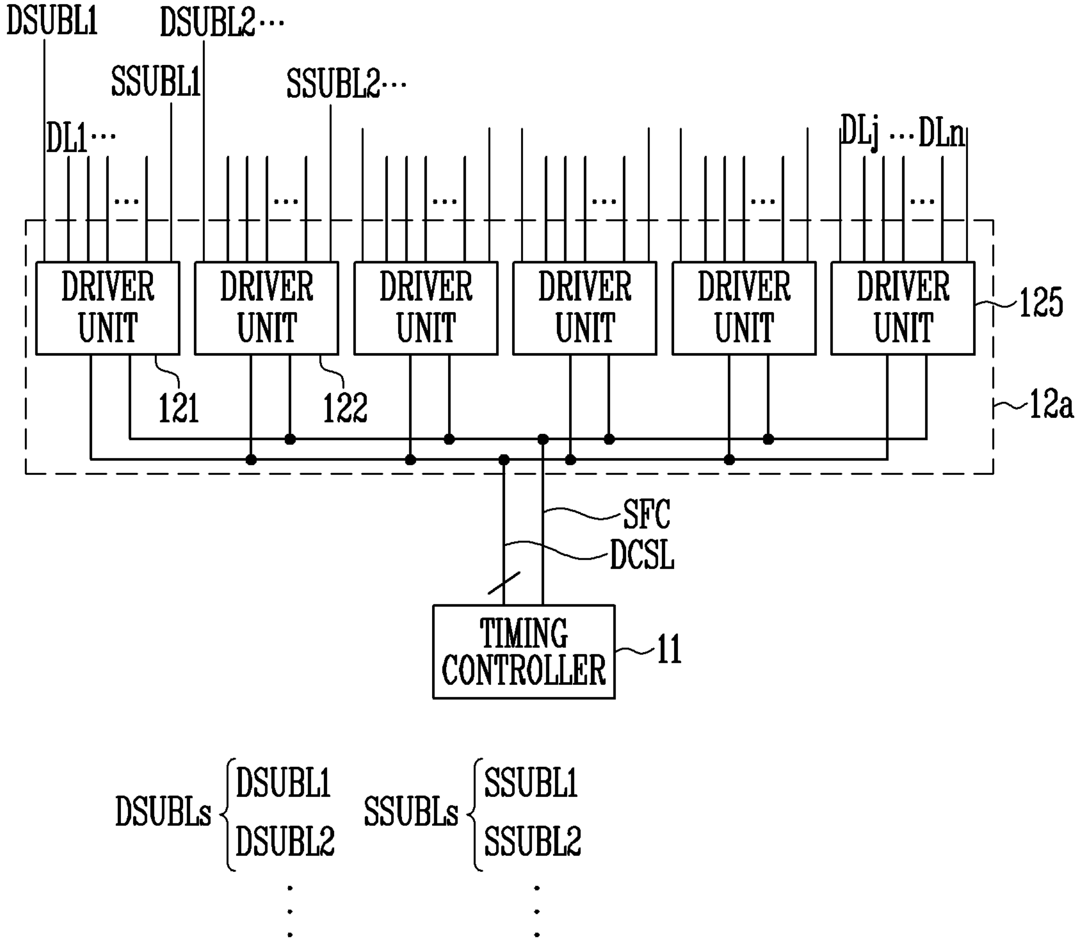
FIG. 3 is a diagram illustrating a data driver in accordance with an embodiment of the present disclosure.

FIG. 3 is a diagram illustrating a data driver in accordance with an embodiment of the present disclosure.

Referring to FIG. 3, a first data driver 12*a* in accordance with an embodiment of the present disclosure may include a plurality of driver units 121, 122, and 125. When the display device 10*a* includes the plurality of driver units 121, 122, and 125, the data lines from DL1 to DLn may be grouped into data line groups, and each data line group may be coupled to a corresponding driver unit.

The driver units 121, 122, and 125 may use one clock training line SFC as a common bus line. For example, the timing controller 11 may simultaneously transfer a signal notifying that a clock training pattern is to be supplied to all the driver units 121, 122, and 125 through the one clock training line SFC.

The driver units 121, 122, and 125 may be coupled to the timing controller 11 through dedicated clock data lines DCSL. For example, when the display device 10*a* includes the plurality of driver units 121, 122, and 125, the driver units 121, 122, and 125 may be coupled to the timing controller 11 through the each of clock data lines DCSL.

At least one clock data line DCSL may be coupled to each of the driver units 121, 122, and 125. For example, a plurality of clock data lines DCSL may be coupled to each driver unit so as to prepare for a case where it is insufficient to achieve a desired bandwidth of a transmission signal by using only one clock data line DCSL. In addition, each driver unit may require a plurality of clock data lines DCSL, even when the clock data line DCSL is configured as a differential signal line so as to remove a common mode noise.

Each of the driver units 121, 122, and 125 may include a first power source and a second power source. Each of the first power sources may be coupled to at least one of first power sub-lines DSUBLs. Each of the second power sources may be coupled to at least one of second power sub-lines SSUBLs. Each first power source may supply a first power voltage through the first power sub-line. Each second power source may supply a second power voltage through the second power sub-line.

For example, the driver unit 121 may supply the first power voltage to the first power line ELVDDL through a first power sub-line DSUBL1, and supply the second power voltage to the second power line ELVSSL through a second power sub-line SSUBL1. Similarly, the driver unit 122 may supply the first power voltage to the first power line ELVDDL through a first power sub-line DSUBL2, and supply the second power voltage to the second power line ELVSSL through a second power sub-line SSUBL2.

Figure 4:
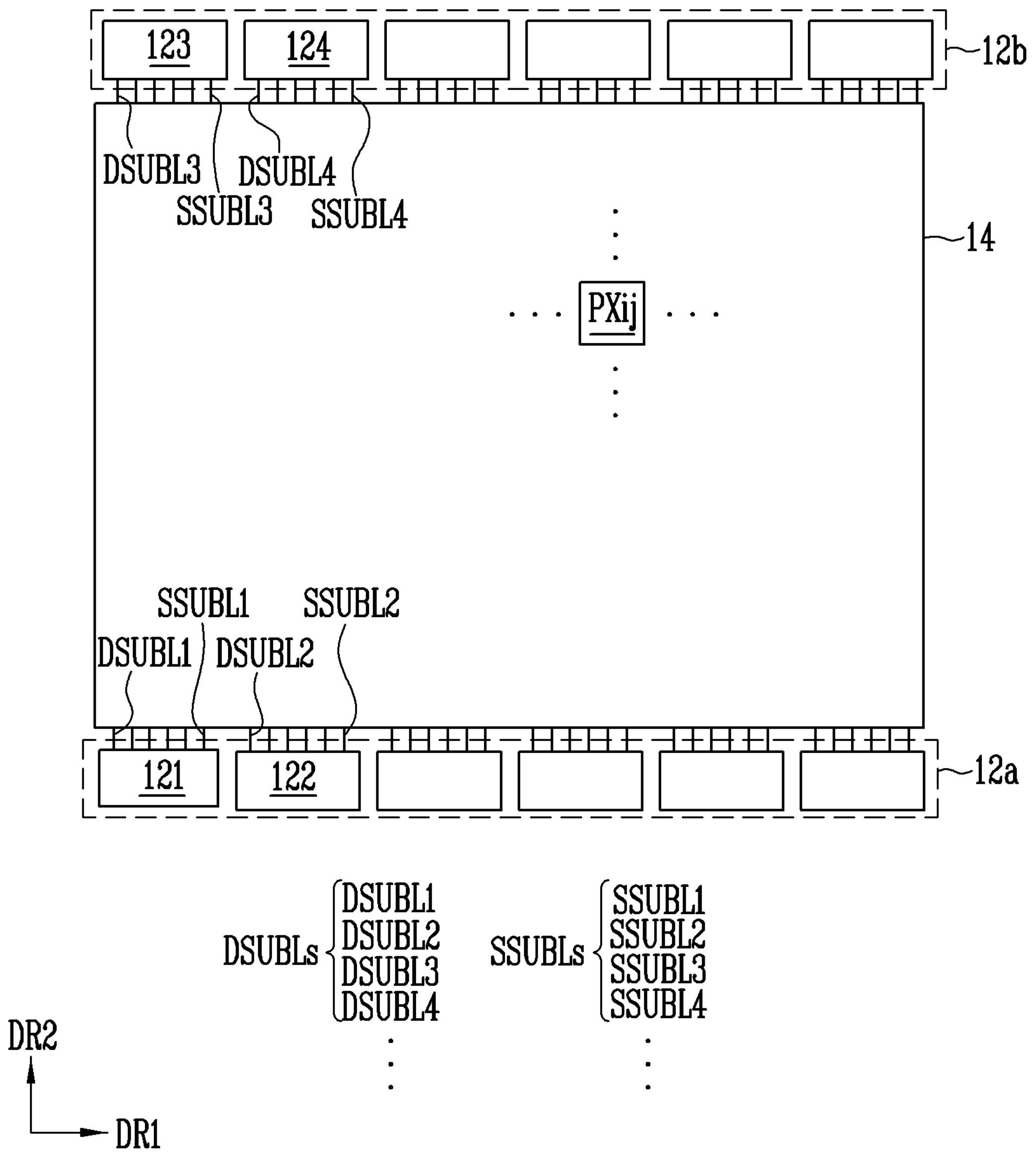
FIG. 4 is a diagram illustrating an arrangement of a pixel unit and the data driver in accordance with an embodiment of the present disclosure.

FIG. 4 is a diagram illustrating an arrangement of the pixel unit and the data driver in accordance with an embodiment of the present disclosure.

Referring to FIG. 4, a case where the data driver 12 includes a first data driver 12*a* and a second data driver 12*b* is illustrated.

The pixel unit 14 may have a planar shape extending in a first direction DR1 and a second direction DR2 orthogonal to the first direction DR1. In this embodiment, for convenience of description, a case where the pixel unit 14 is provided in a rectangular shape is illustrated as an example. In another embodiment, the pixel unit 14 may be provided in a circular shape, an elliptical shape, a rhombus shape, or the like. Also, the pixel unit 14 may have a planar shape of which a portion is changed when the pixel unit 14 is curved, foldable, or rollable.

The first data driver 12*a* may be located at the bottom portion of the pixel unit 14 and extend along the second direction DR2 in parallel with the pixel unit 14. The first data driver 12*a* may include a plurality of driver units 121 and 122. The driver units 121 and 122 may include first power sub-lines DSUBL1 and DSUBL2 and second power sub-lines SSUBL1 and SSUBL2, which extend in the second direction DR2. The first power sub-lines DSUBL1 and DSUBL2 may be arranged in the first direction DR1. The second power sub-lines SSUBL1 and SSUBL2 may be arranged in the first direction DR1.

The second data driver 12*b* may be located at the upper portion of the pixel unit 14 and extend along the second direction DR2 in parallel with the pixel unit 14. The second data driver 12*b* may include a plurality of driver units 123 and 124. The driver units 123 and 124 may include first power sub-lines DSUBL3 and DSUBL4 and second power sub-lines SSUBL3 and SSUBL4, which extend in the second direction DR2. The first power sub-lines DSUBL3 and DSUBL4 may be arranged in the first direction DR1. The second power sub-lines SSUBL3 and SSUBL4 may be arranged in the first direction DR1.

Figure 5:
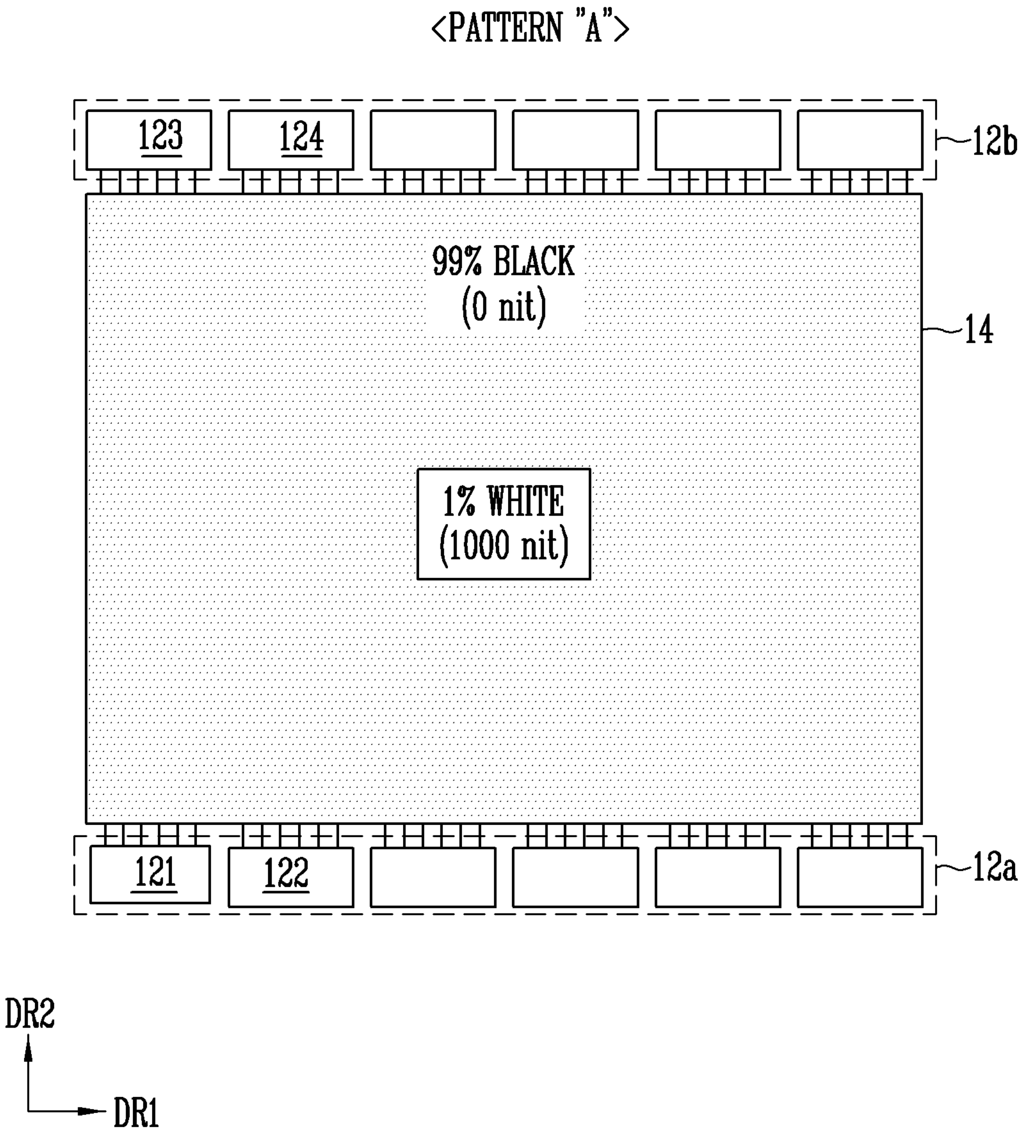
FIGS. 5, 6, and 7 are diagrams illustrating example patterns of frames.
Figure 6:
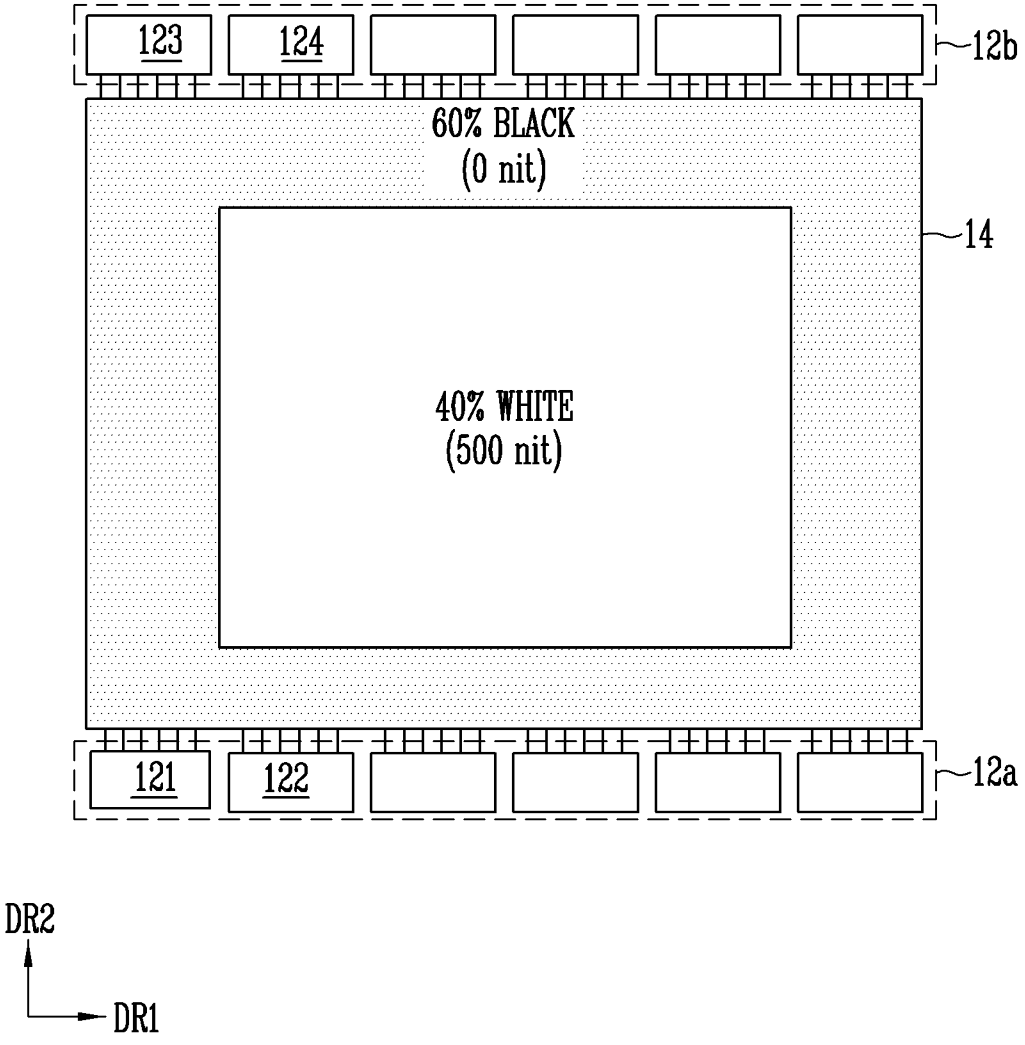
Figure 7:
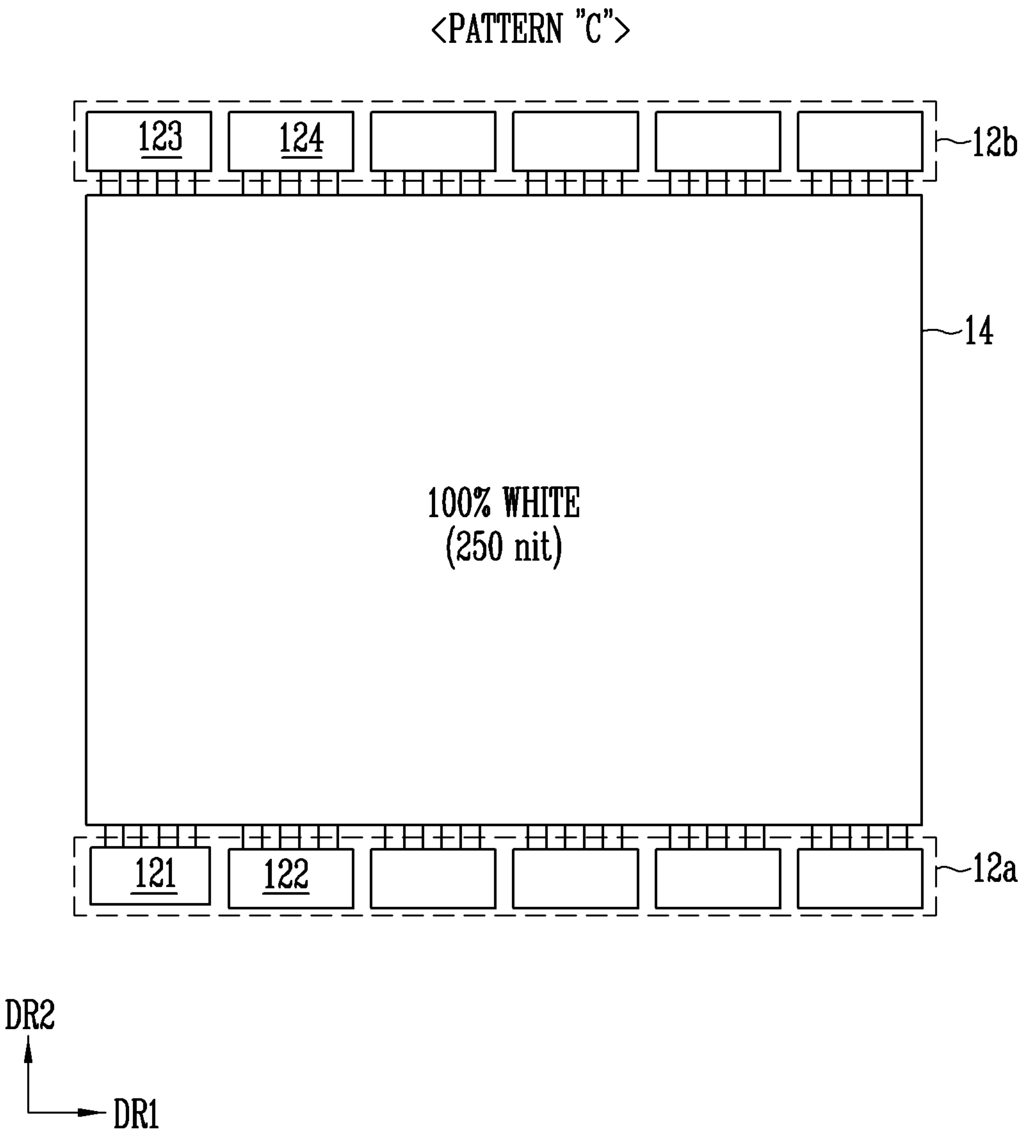
Figure 8:
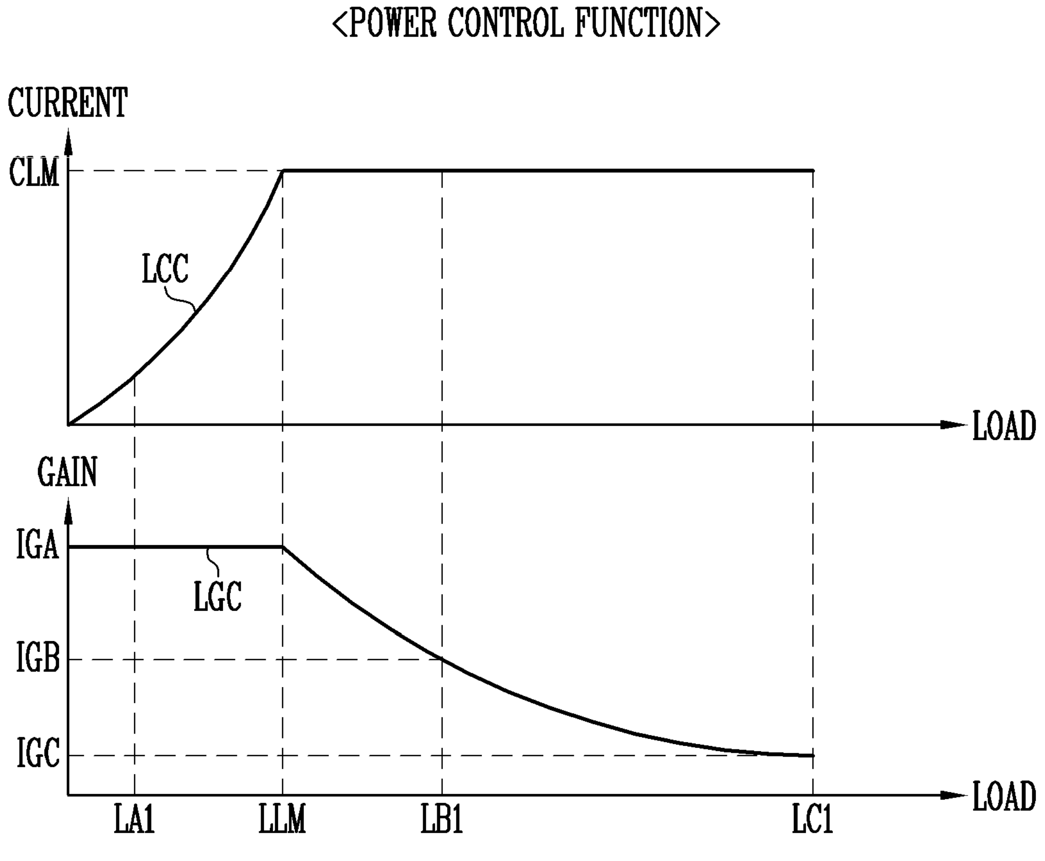
FIG. 8 is a diagram illustrating a current sensor and an initial gain provider.

FIGS. 5, 6, and 7 are diagrams illustrating example patterns of frames. FIG. 8 is a diagram illustrating a current sensor and an initial gain provider.

Referring to FIG. 5, pattern "A" is illustrated, in which 99% of the pixels of the pixel unit 14 display a black grayscale (e.g., grayscale 0) and 1% of the pixels of the pixel unit 14 display a white grayscale (e.g., grayscale 255). Referring to FIG. 6, pattern "B" is illustrated, in which 60% of the pixels of the pixel unit 14 display the black grayscale and 40% of the pixels of the pixel unit 14 display the white grayscale. Referring to FIG. 7, pattern "C" is illustrated, in which 100% of the pixels of the pixel unit 14 display the white grayscale.

A load value of the pattern "C" may be largest, and a load value of the pattern "A" may be smallest. The load value may correspond to input grayscale values of one frame. In an example, the load value may be a value obtained by adding up input grayscale values of one frame. In another example, the load value may be an average value of input grayscale values of one frame.

A graph LCC at an upper portion shown in FIG. 8 represents sensing value SSC with respect to load value. As described above, the current sensor 15 may provide a sensing value SSC of a current flowing in the first power line ELVDDL. When a load value increases according to an image pattern, branch currents required in the pixels increase, and therefore, a global current flowing through the first power line ELVDDL also increases.

As described above, the initial gain provider 16 may provide an initial gain value IG such that the sensing value SSC is smaller than a current limit value CLM. The initial gain provider 16 controls the initial gain value IG such that the global current does not exceed the current limit value CLM, to apply a primary limit such that the display device 10*a* does not excessive consume power.

For example, the initial gain driver 16 may maximally maintain the initial gain value IG when the sensing value SSC is smaller than the current limit value CLM. The initial gain value IG may be 1 (or 100%). The initial gain provider 16 decreases the initial gain value IG when the sensing value SSC reaches the current limit value CLM, so that the current flowing through the first power line ELVDDL can be prevented from increasing. The initial gain value IG may be smaller than 1 (or 100%). That is, in a frame having a load value greater than a load value LLM, a luminance corresponding to each grayscale decreases as the load value increases.

For example, according to a graph LGC at a lower portion shown in FIG. 8, in the case of the pattern "A," a current flowing corresponding to a load value LA1 is smaller than the current limit value CLM, and therefore, the initial gain provider 16 may provide an initial gain value IGA which is 1. Therefore, pixels corresponding to the white grayscale in the pattern "A" may emit light with a maximum luminance (e.g., 1000 nits).

However, in the case of the pattern "B," it is necessary to limit a current flowing corresponding to a load value LB1 to be smaller than the current limit value CLM, and therefore, the initial gain provider 16 may provide an initial gain value IGB which is smaller than 1. Therefore, pixels corresponding to the white grayscale in the pattern "B" may emit light with a luminance (e.g., 500 nits) lower than the maximum luminance.

Also, in the case of the pattern "C," it is necessary to limit a current flowing corresponding to a load value LC1 to be smaller than the current limit value CLM, and therefore, the initial gain provider 16 may provide an initial gain value IGC which is smaller than 1. Therefore, pixels corresponding to the white grayscale in the pattern "C" may emit light with a luminance (e.g., 250 nits) lower than the maximum luminance.

Figure 9:
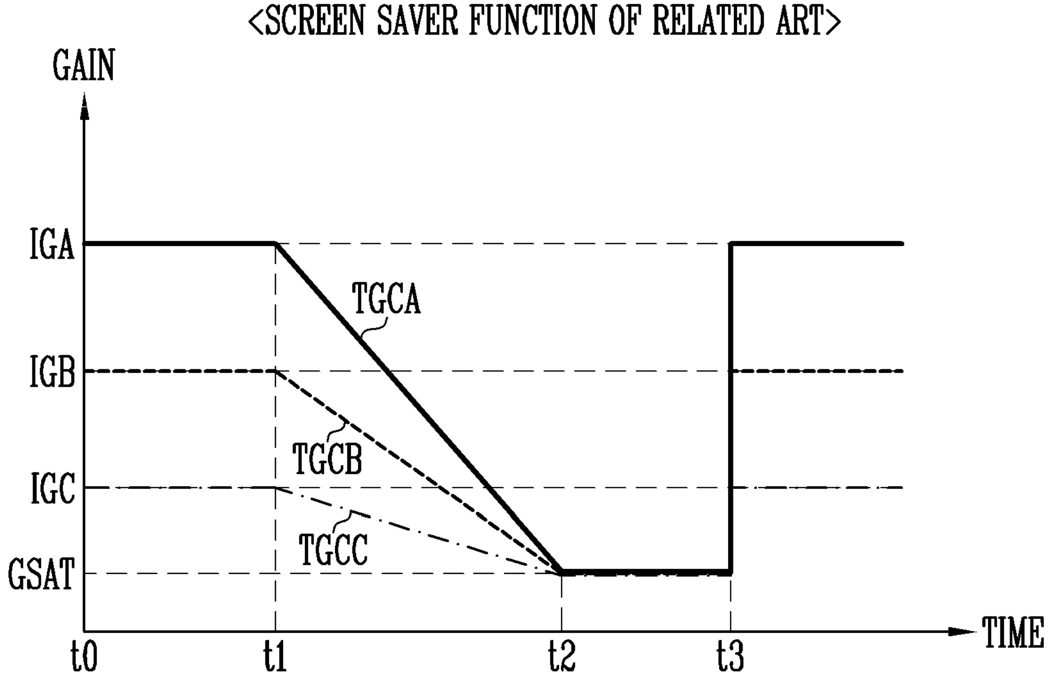
FIG. 9 is a diagram illustrating a problem when a screen saver function is used.

FIG. 9 is a diagram illustrating a problem when the screen saver function is used.

Referring to FIG. 9, when the display device 10*a* is driven according to the screen saver function, a graph TGCA of gain values corresponding to the pattern "A," a graph TGCB of gain values corresponding to the pattern "B," and a graph TGCC of gain values corresponding to the pattern "C" are illustrated.

As described above, the screen saver function decreases a luminance of a still image when the display device 10*a* displays the image, so that occurrence of an afterimage can be prevented and power consumption can be reduced. For example, the luminance of the still image may be gradually decreased from a first time t1 when a first period elapses from a display start time t0 of the still image. The decrease in luminance may be achieved by decreasing a gain value. In addition, the luminance of still image may be maintained from a second time t2 after the first time t1. The maintenance of the luminance may be achieved by maintaining the gain value. The gain value may be a saturation gain value GSAT which is a minimum value. In addition, the gain value may return to an initial gain value at a third time t3 after the second time t2. The third time t3 is a time at which a difference between load values of previous/next frames is a predetermined threshold value or more, such as a time at which the still image is changed to another still image or a time at which the still image is changed to a moving image. The third time t3 is a time at which the screen save function is ended.

As described above, the patterns "A," "B," and "C" have different initial gain values IGA, IGB, and IGC. In particular, in the case of the pattern "A" which has a large degree of change in gain value, a flicker occurring when the screen saver function is used may be viewed by a user.

Figure 10:
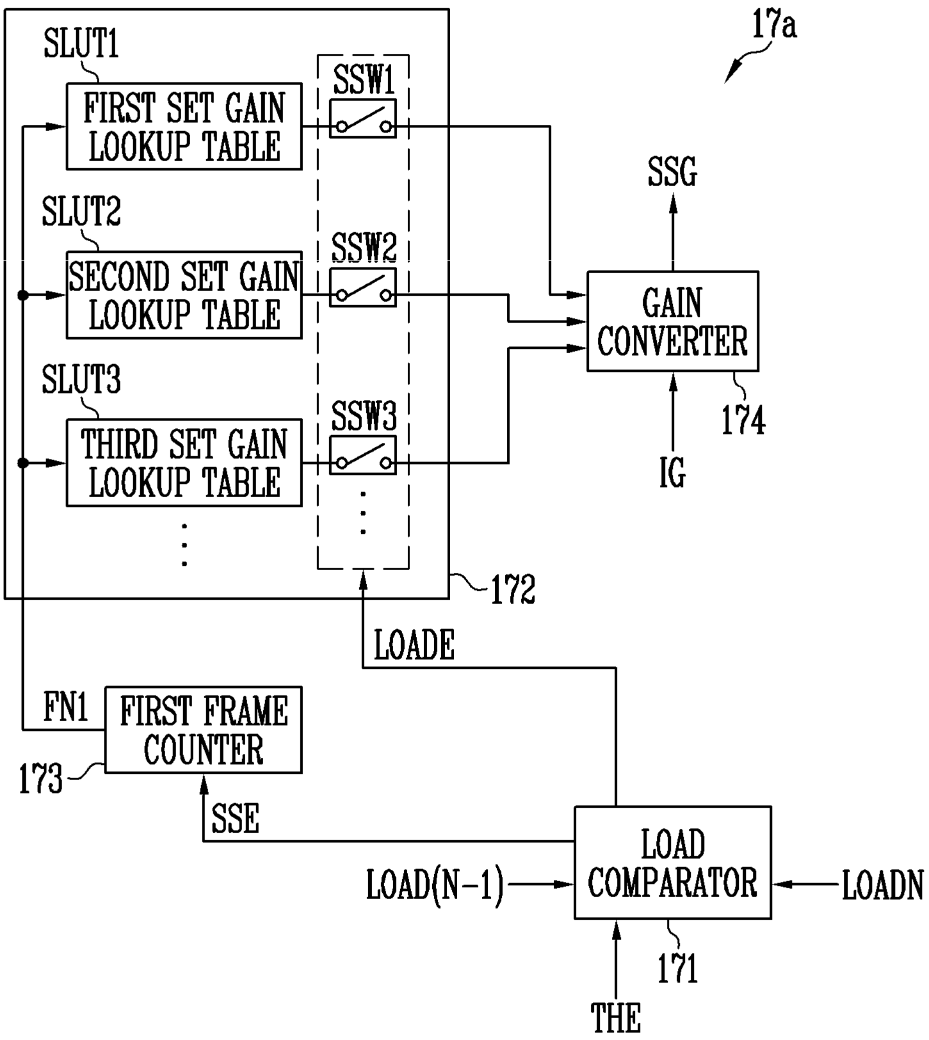
FIG. 10 is a diagram illustrating a gain provider in accordance with an embodiment of the present disclosure.
Figure 11:
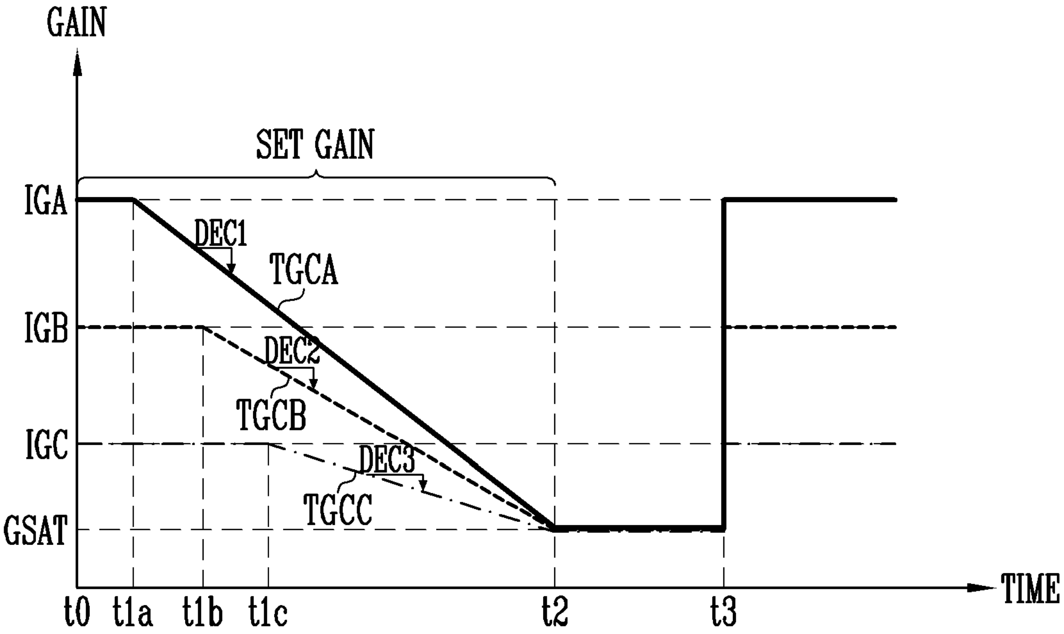
FIG. 11 is a diagram illustrating an embodiment of an operation of the gain provider shown in FIG. 10.

FIG. 10 is a diagram illustrating a gain provider in accordance with an embodiment of the present disclosure. FIG. 11 is a diagram illustrating an embodiment of an operation of the gain provider shown in FIG. 10.

Referring to FIG. 10, the gain provider 17*a* in accordance with the embodiment of the present disclosure may include a load comparator 171, a set gain controller 172, a first frame counter 173, and a gain converter 174.

The load comparator 171 may generate an enable signal SSE when a difference between a load value LOAD(N−1) of a first frame and a load value LOADN of a second frame is smaller than an enable threshold value THE. For example, the second frame may be a frame consecutive to the first frame. For example, the second frame may be a frame next to the first frame.

Each of the load values LOAD(N−1) and LOADN may correspond to input grayscale values of one frame as described above. In an example, the load value may be a value obtained by adding up input grayscale values of one frame. In another example, load value may be an average value of input grayscale values of one frame. When the input grayscale values are distinguished from each other, such as red, green, and blue, the same weight may be applied to the colors.

When the difference between the load value LOAD(N−1) of the first frame and the load value LOADN of the second frame is smaller than the enable threshold value THE, grayscale values of the first frame and grayscale values of the second frame may be substantially equal to each other, and therefore, the first frame and the second frame may correspond to a still image.

The first frame counter 173 may provide a first count value FN1 of frames from a time t0 at which the enable signal SSE is generated. That is, the first count value FN1 may increase from the time t0. The first count value FN1 may provide time information using one frame period as a unit. For example, the first frame counter 173 may generate the first count value FN1 by counting pulses of a vertical synchronization signal.

The vertical synchronization signal may include a plurality of pulses, and indicate that a previous frame period is ended and a current frame period is started, with respect to a time at which each of the pulses is generated. An interval between adjacent pulses of the vertical synchronization signal may correspond to one frame period.

The set gain controller 172 may determine a first period, based on a first load value LOADE and the first count value FN1. The first period may be a period from the time t0 at which the enable signal SSE is generated to a first time. The first load value LOADE may be based on input grayscale values at the time t0 at which the enable signal SSE is generated. That is, the first load value LOADE may be a load value of a frame corresponding to the time t0. For example, when the enable signal SSE is generated based on the difference between the load values LOAD(N−1) and LOADN, the first load value LOADE may be equal to the load value LOADN.

The set gain controller 172 may include a plurality of set gain lookup tables SLUT1, SLUT2, and SLUT3 set different from each other according to the first load value LOADE. The set gain controller 172 may provide a first gain ratio value corresponding to the first count value FN1 with reference to a set gain lookup table selected according to the first load value LOADE. The first gain ratio value may be equal to 1 (or 100%) or less than 1 (100%).

The gain converter 174 may convert an initial gain value IG into a gain value SSG according to the first gain ratio value.

When the set gain controller 172 receives a first load value LOADE belonging to a first period, the set gain controller 172 may select a first set gain lookup table SLUT1. A first switch SSW1 may be turned on. The first switch SSW1 may be implemented with an algorithm instead of an actual switch. The first set gain lookup table SLUT1 may include first gain ratio values corresponding to the first count value FN1, with respect to first load values LOADE belonging to the first period. For example, the first set lookup table SLUT1 may include first gain ratio values which are 1 with respect to the first count value FN1 corresponding to a first period t0 to t1*a*. The first set gain lookup table SLUT1 may include first gain ratio values which gradually decrease with respect to a first count value FN1 corresponding to a period t1*a* to t2. The first set gain lookup table SLUT1 may include first gain ratio values which are constantly maintained with respect to a first count value FN1 corresponding to a period after the second time t2.

For example, when a frame of the pattern "A" has a load value belonging to the first period, the first set gain lookup table SLUT1 may be selected. The gain converter 174 may provide a gain value SSG obtained by sequentially converting the initial gain value IGA according to the first gain ratio value of the first set gain lookup table SLUT1 (see the graph TGCA shown in FIG. 11).

When the set gain controller 172 receives a first load value LOADE belonging to a second period, the set gain controller 172 may select a second set gain lookup table SLUT2. Load values belonging to the second period may be greater than those belonging to the first period. A second switch SSW2 may be turned on. The second switch SSW2 may be implemented with an algorithm instead of an actual switch. The second set gain lookup table SLUT2 may include first gain ratio values corresponding to the first count value FN1, with respect to first load values LOADE belonging to the second period. For example, the second set lookup table SLUT2 may include first gain ratio values which are 1 with respect to the first count value FN1 corresponding to a first period t0 to t1*b*. The second set gain lookup table SLUT2 may include first gain ratio values which gradually decrease with respect to a first count value FN1 corresponding to a period t1*b* to t2. The second set gain lookup table SLUT2 may include first gain ratio values which are constantly maintained with respect to a first count value FN1 corresponding to a period after the second time t2.

For example, when a frame of the pattern "B" has a load value belonging to the second period, the second set gain lookup table SLUT2 may be selected. The gain converter 174 may provide a gain value SSG obtained by sequentially converting the initial gain value IGA according to the first gain ratio value of the second set gain lookup table SLUT2 (see the graph TGCB).

When the set gain controller 172 receives a first load value LOADE belonging to a third period, the set gain controller 172 may select a third set gain lookup table SLUT3. Load values belonging to the third period may be greater than those belonging to the second period. A third switch SSW3 may be turned on. The third switch SSW3 may be implemented with an algorithm instead of an actual switch. The third set gain lookup table SLUT3 may include first gain ratio values corresponding to the first count value FN1, with respect to first load values LOADE belonging to the third period. For example, the third set lookup table SLUT3 may include first gain ratio values which are 1 with respect to the first count value FN1 corresponding to a first period t0 to t1*c*. The third set gain lookup table SLUT3 may include first gain ratio values which gradually decrease with respect to a first count value FN1 corresponding to a period t1*c* to t2. The third set gain lookup table SLUT3 may include first gain ratio values which are constantly maintained with respect to a first count value FN1 corresponding to a period after the second time t2.

For example, when a frame of the pattern "C" has a load value belonging to the third period, the third set gain lookup table SLUT3 may be selected. The gain converter 174 may provide a gain value SSG obtained by sequentially converting the initial gain value IGA according to the first gain ratio value of the third set gain lookup table SLUT3 (see the graph TGCC shown in FIG. 11).

That is, the gain provider 17*a* may gradually decrease the gain value SSG from a first time t1*a*, t1*b*, or t1*c* when the first period elapses from the time t0 at which the enable signal SSE is generated. Also, the gain provider 17*a* may determine a length of the first period t0 to t1*a*, t0 to t1*b*, or t0 to t1*c* according to the first load LOADE based on the input grayscale values at the time t0 at which the enable signal SSE is generated. That is, the length of the first period t0 to t1*a*, t0 to t1*b*, or t0 to t1*c* may be changed depending on the sensing value SSC at the time t0 at which the display of a still image is started.

That is, the gain provider 17*a* may set the first period t0 to t1*a*, t0 to t1*b*, or t0 to t1*c* to become shorter as the first load value LOADE becomes smaller. Also, the gain provider 17*a* may allow the gain value SSG to be maintained from the second time t2 after the first time t1*a*, t1*b*, or t1*c*. An interval between the time t0 at which the enable signal SSE is generated and the second time t2 may be set constant, regardless of the first load value LOADE.

Figure 12:
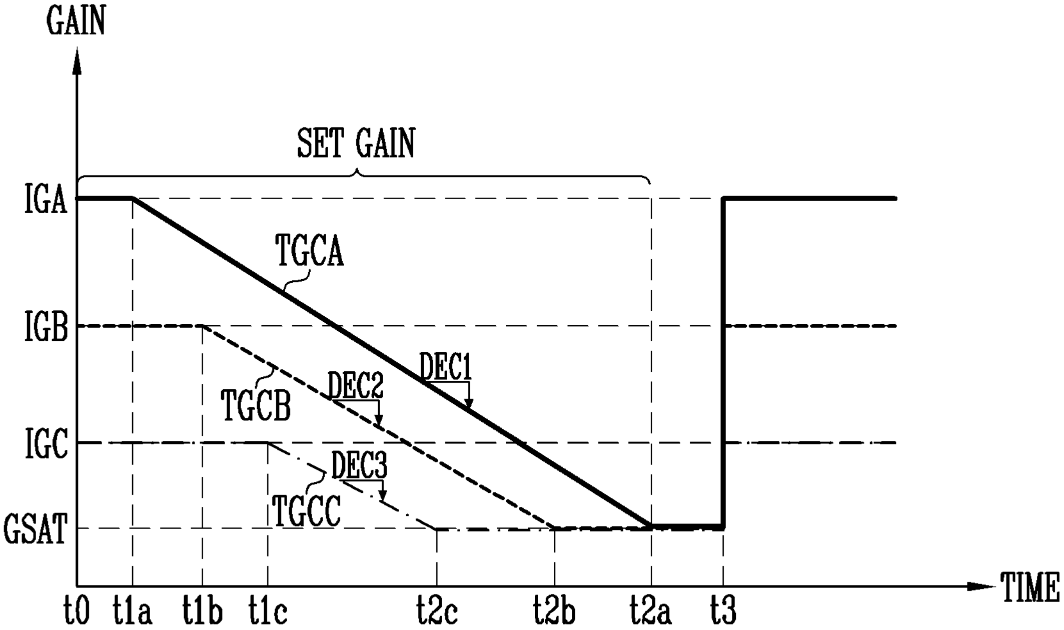
FIG. 12 is a diagram illustrating another embodiment of the operation of the gain provider shown in FIG. 10.

FIG. 12 is a diagram illustrating another embodiment of the operation of the gain provider shown in FIG. 10.

In the embodiment shown in FIG. 12 is different from the embodiment shown in FIG. 11, in that the interval between the time t0 at which the enable signal SSE is generated and the second time t2 may be set longer as the first load LOADE becomes smaller.

Referring to FIG. 12, it can be seen that an interval between the time t0 at which the enable signal SSE is generated and a second time t2*a* is relatively long in the graph TGCA which is a case where the load value is relatively small, and an interval between the time t0 at which the enable signal SSE is generated and a second time t2*c* is relatively short in the graph TGCC which is a case where the load value is relatively large. That is, an interval between the time t0 at which the display of the still image is started and the second time t2*a*, t2*b*, or t2*c* may be set longer as the sensing value SSC at the time t0 at which the display of the still image is started becomes smaller.

In accordance with this embodiment, a decrement of luminance when the screen saver function is performed can be consistent, regardless of the magnitude of the first load value LOADE, i.e., regardless of the kind of an image pattern.

It can be seen that decrements DEC1, DEC2, and DEC3 of the graphs TGCA, TGCB, and TGCC are constant in the embodiment shown in FIG. 12, and decrements DEC1, DEC2, and DEC3 of the graphs TGCA, TGCB, and TGCC are different from one another in the embodiment shown in FIG. 11.

Figure 13:
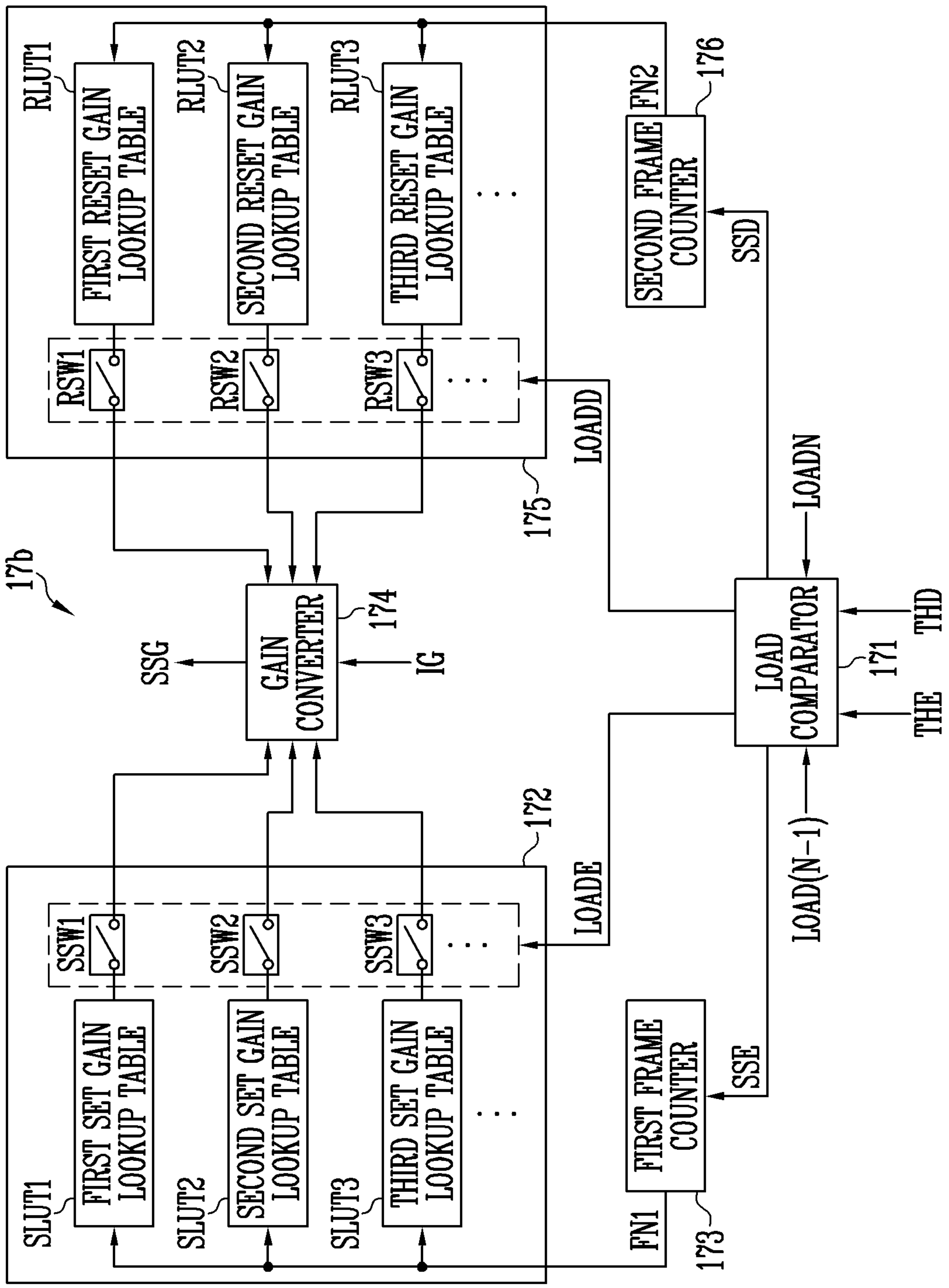
FIG. 13 is a diagram illustrating a gain provider in accordance with another embodiment of the present disclosure.
Figure 14:
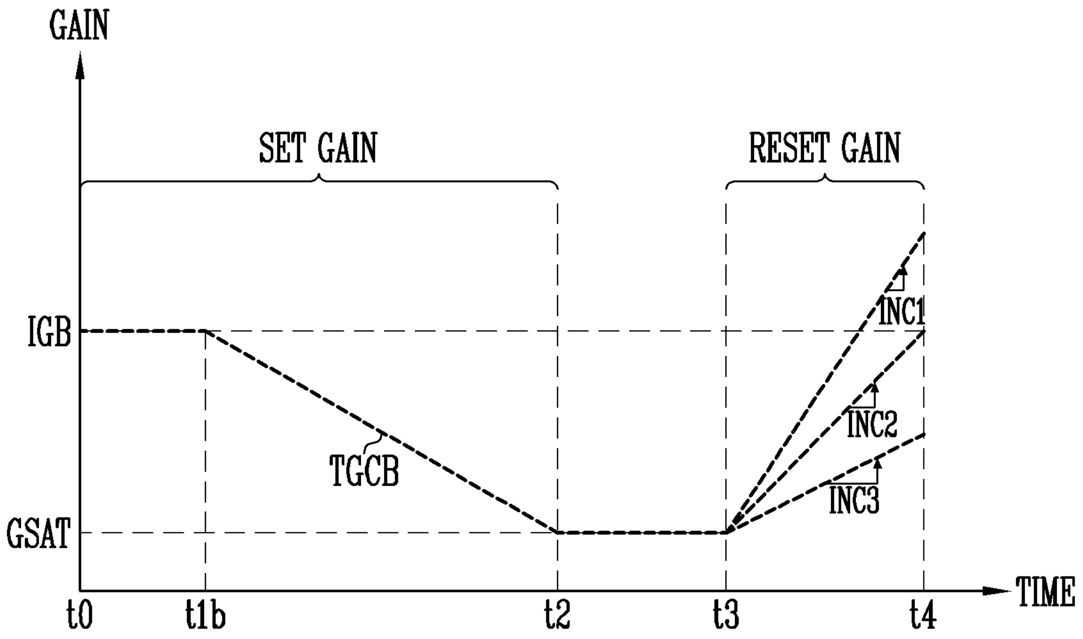
FIG. 14 is a diagram illustrating an embodiment of an operation of the gain provider shown in FIG. 13.

FIG. 13 is a diagram illustrating a gain provider in accordance with another embodiment of the present disclosure. FIG. 14 is a diagram illustrating an embodiment of an operation of the gain provider shown in FIG. 13. A graph TGCB corresponding to the pattern "B" is illustrated in FIG. 14.

Referring to FIG. 13, the gain provider 17*b* in accordance with the another embodiment of the present disclosure may include a load comparator 171, a set gain controller 172, a first frame counter, a gain converter 174, a reset gain controller 175, and a second frame counter 176. Hereinafter, portions different from those of the gain provider 17*b* shown in FIG. 10 will be mainly described.

The load comparator 171 may generate a disable signal SSD when a difference between a load value LOAD(N−1) of a third frame and a load value LOADN of a fourth frame is greater than a disable threshold value THD. For example, the fourth frame may be a frame consecutive to the third frame. For example, the fourth frame may be a frame next to the third frame. The third and fourth frames may be frames different from the first and second frames.

When the difference between the load value LOAD(N−1) of the third frame and the load value LOADN of the fourth frame is greater than the disable threshold value THD, grayscale values of the third frame and grayscale values of the fourth frame may be different from each other, and therefore, the third frame and the fourth frame may correspond to moving images (different images).

The second frame count 176 may provide a second count value FN2 of frames from a time t3 at the disable signal SSD is generated. That is, the second count value FN2 may increase from the time t3. The second count value FN2 may provide time information using one frame period as a unit. For example, the second frame counter 176 may generate the second count value FN2 by counting pulses of a vertical synchronization signal.

The reset gain controller 175 may determine an increase rate of a gain value SSG, based on a second load value LOADD and the second count value FN2. The reset gain controller 175 may include a plurality of reset gain lookup tables RLUT1, RLUT2, and RLUT3 different from each other according to the second load value LOADD.

The second load value LOADD may be based on input grayscale values at the time t3 at which the disable signal SSD is generated. That is, the second load value LOADD may be a load value of a frame corresponding to the time t3. For example, when the disable signal SSD is generated based on the difference between the load values LOAD(N−1) and LOADN, the second load value LOADD may be equal to the load value LOADN.

The reset gain controller 175 may include a plurality of reset gain lookup tables RLUT1, RLUT2, and RLUT3 differently set according to the second load value LOADD. The reset gain controller 175 may provide a second gain ratio value corresponding to the second count value FN2 with reference to a reset gain lookup table selected according to the second load value LOADD. The second gain ratio value may be equal to 1 (or 100%) or less than 1 (or 100%).

The gain converter 174 may convert an initial gain value IG into the gain value SSG according to the second gain ratio value.

When the reset gain controller 175 receives a second load value LOADD belonging to a fourth period, the reset gain controller 175 may select a first reset gain lookup table RLUT1. A first switch RSW1 may be turned on. The first switch RSW1 may be implemented with an algorithm instead of an actual switch. The first reset gain lookup table RLUT1 may include second gain ratio values corresponding to the second count value FN2, with respect to second load values LOADD belonging to the fourth period. For example, the first reset gain lookup table RLUT1 may include second gain ratio values which gradually increase according to a first increase rate INC1, corresponding to the second count value FN2.

The gain converter 174 may provide a gain value SSG obtained by sequentially converting an initial gain value IGB according to the second gain ratio value of the first reset gain lookup table RLUT1.

When the reset gain controller 175 receives a second load value LOADD belonging to a fifth period, the reset gain controller 175 may select a second reset gain lookup table RLUT2. Load values belonging to the fifth period may be smaller than those belonging to the fourth period. A second switch RSW2 may be turned on. The second switch RSW2 may be implemented with an algorithm instead of an actual switch. The second reset gain lookup table RLUT2 may include second gain ratio values corresponding to the second count value FN2, with respect to second load values LOADD belonging to the fifth period. For example, the second reset gain lookup table RLUT2 may include second gain ratio values which gradually increase according to a second increase rate INC2, corresponding to the second count value FN2. The second increase rate INC2 may be smaller than the first increase rate INC1.

The gain converter 174 may provide a gain value SSG obtained by sequentially converting the initial gain value IGB according to the second gain ratio value of the second reset gain lookup table RLUT2.

When the reset gain controller 175 receives a second load value LOADD belonging to a sixth period, the reset gain controller 175 may select a third reset gain lookup table RLUT3. Load values belonging to the sixth period may be smaller than those belonging to the fifth period. A third switch RSW3 may be turned on. The third switch RSW3 may be implemented with an algorithm instead of an actual switch. The third reset gain lookup table RLUT3 may include second gain ratio values corresponding to the second count value FN2, with respect to second load values LOADD belonging to the sixth period. For example, the third reset gain lookup table RLUT3 may include second gain ratio values which gradually increase according to a third increase rate INC3, corresponding to the second count value FN2. The third increase rate INC3 may be smaller than the second increase rate INC2.

The gain converter 174 may provide a gain value SSG obtained by sequentially converting the initial gain value IGB according to the second gain ratio value of the third reset gain lookup table RLUT3.

That is, the gain provider 17*b* may gradually increase the gain value SSG from the third time t3 after a second time t2. The gain provider 17*b* may determine the increase rate INC1, INC2, or INC3 of the gain value SSG according to the second load LOADD based on the input grayscale values at the third time t3. In another embodiment, the gain provider 17*b* may determine the increase rate INC1, INC2, or INC3 of the gain value SSG according to a difference between the second load value LOADD and the first load value LOADE.

In accordance with this embodiment, when the screen saver function is ended, the gain value SSG gradually increases, and thus the problem of a flicker can be reduced.

In accordance with this embodiment, the increase rate of the gain value SSG is determined to become smaller as the second load value LOADD becomes smaller. Thus, when a dark image is displayed at the time at which the screen saver function is ended, the increase rate of the gain value SSG is set to become small, so that a flicker may be reduced even when a bright image is subsequently displayed. On the other hand, when a bright image is displayed at the time at which the screen saver function is ended, it is less likely that a flicker will occur even when a bright image is subsequently displayed. Thus, there is no problem even when the increase rate of the gain value SSG is set relatively large.

Figure 15:
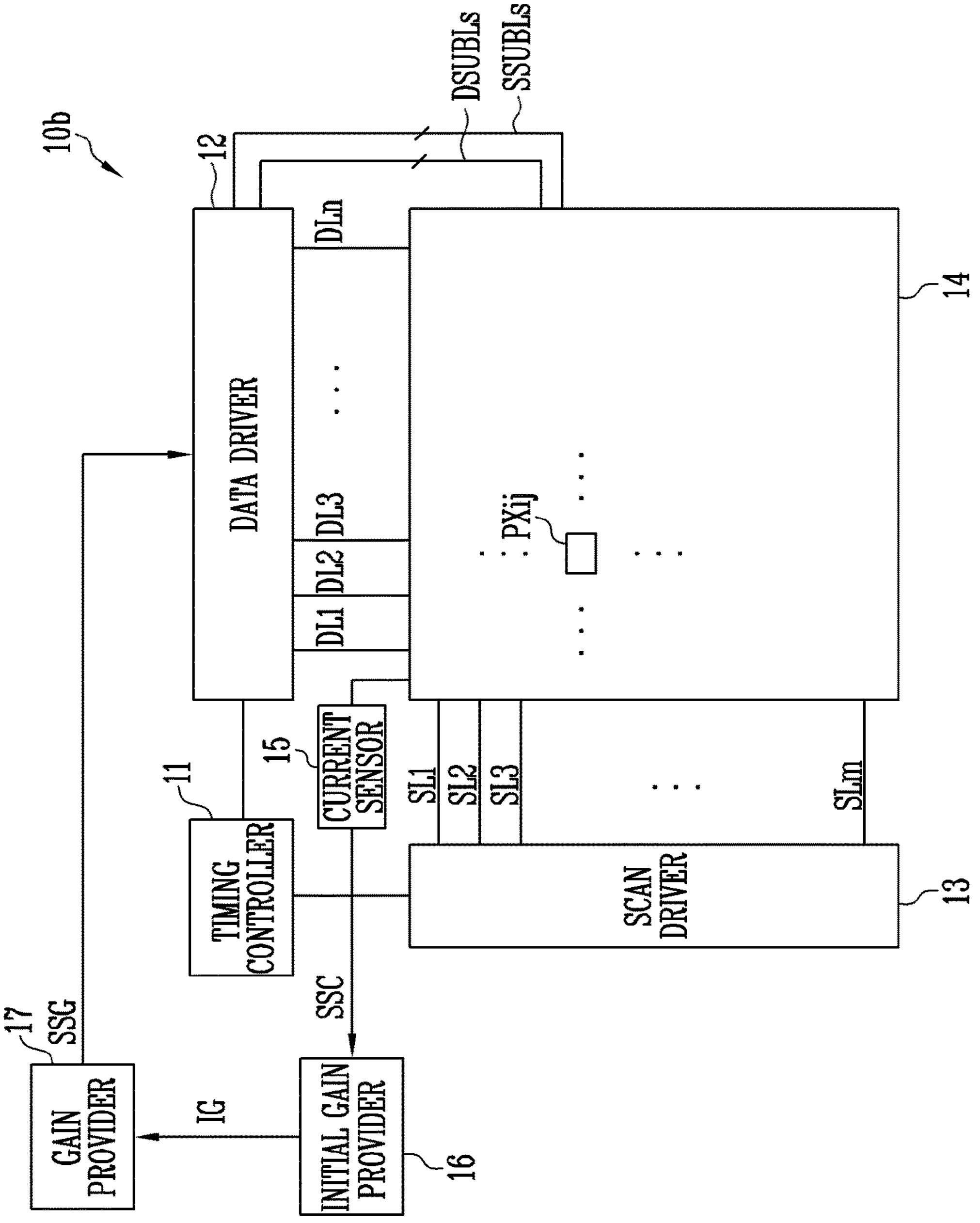
FIG. 15 is a diagram illustrating a display device in accordance with another embodiment of the present disclosure.

FIG. 15 is a diagram illustrating a display device in accordance with another embodiment of the present disclosure.

Referring to FIG. 15, the display device 10*b* in accordance with another embodiment of the present disclosure may include a timing controller 11, a data driver 12, a scan driver 13, a pixel unit 14, a current sensor 15, an initial gain provider 16, and a gain provider 17. Hereinafter, portions different from those of the display device 10*a* shown in FIG. 1.

In accordance with the embodiment shown in FIG. 15, the gain provider 17 may provide a gain value SSG to the data driver 12. In this embodiment, the grayscale converter is unnecessary.

Figure 16:
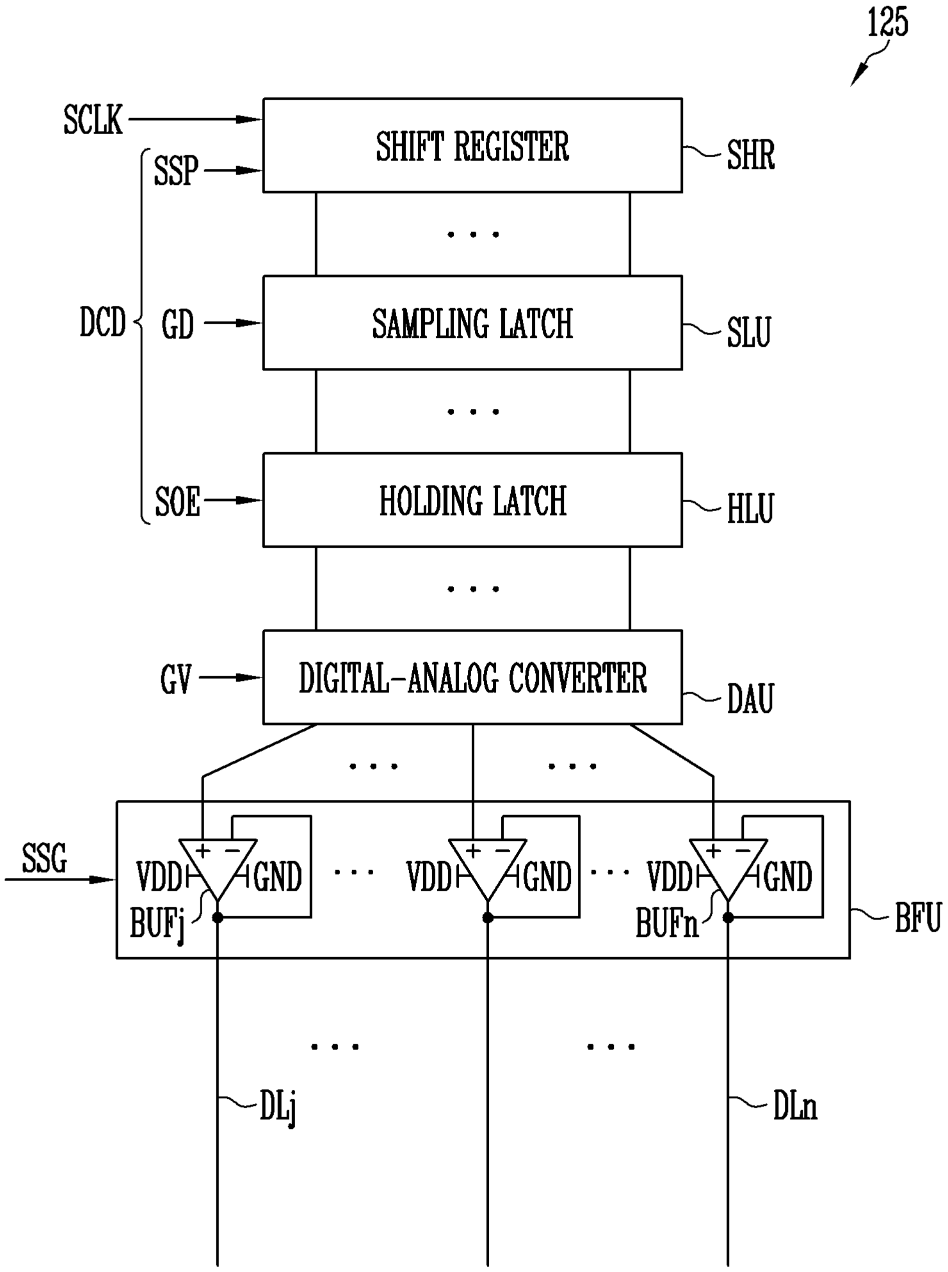
FIG. 16 is a diagram illustrating a data driver in accordance with an embodiment of the present disclosure.

FIG. 16 is a diagram illustrating a data driver in accordance with an embodiment of the present disclosure.

Referring to FIG. 16, one driver unit 125 included in the data driver 12 is illustrated. Other driver units may have the substantially same structure.

The driver unit 125 may include a shift register SHR, a sampling latch SLU, a holding latch HLU, a digital-analog converter DAU, and an output buffer BFU.

A data control signal DCD received from the timing controller 11 may include a source start pulse SSP, grayscale values GD, a source output enable signal SOE.

The shift register SHR may sequentially generate sampling signals while shifting the source start pulse SSP for every one period of a source shift clock SCLK. A number of the sampling signals may correspond to that of data lines from DLj to DLn. For example, the number of the sampling signals may be equal to that of the data lines from DLj to DLn. In another example, when the display device 10*b* further includes a demultiplexer between the data driver 12 and the data lines from DLj to DLn, the number of the sampling signals may be smaller than that of the data lines from DLj to DLn. For convenience of description, a case where the demultiplexer does not exist is assumed below.

The sampling latch SLU may include sampling latch units of which a number corresponds to that of the data lines from DLj to DLn, and sequentially receive grayscale values GD for an image frame from the timing controller 11. The sampling latch SLU may store the grayscale values GD sequentially received from the timing controller 11 in corresponding sampling latches, in response to the sampling signals sequentially received from the shift register SHR.

The holding latch HLU may further include holding latch units of which a number corresponding to that of the data lines from DLj to DLn. The holding latch HLU may store the grayscale values GD stored in the sampling latch unit in the holding latch units, when the source output enable signal SOE is input.

The digital-analog converter DAU may include digital-analog conversion units of which a number corresponds to that of the data lines from DLj to DLn. For example, the number of the digital-analog conversion units may be equal to that of the data lines from DLj to DLn. Each of the digital-analog conversion units may apply, to a corresponding data line, a grayscale voltage GV corresponding to the grayscale value GD stored in a corresponding holding latch.

The grayscale voltage GV may be provided from a grayscale voltage generator (not shown). The grayscale voltage generator may include a red grayscale voltage generator, a green grayscale voltage generator, and a blue grayscale voltage generator. The grayscale voltage GV may be set such that a luminance corresponding to each grayscale follows a gamma curve.

The output buffer BFU may include buffer units from BUFj to BUFn. For example, each of the buffer units from BUFj to BUFn may be an operational amplifier. Each of the buffer units from BUFj to BUFn may be configured in the form of a voltage follower to apply an output of a corresponding digital-analog conversion unit to a corresponding data line. For example, an inverting terminal of each of the buffer units from BUFj to BUFn may be coupled to its own output terminal, and a non-inverting terminal of each of the buffer units from BUFj to BUFn may be coupled to an output terminal of a corresponding digital-analog conversion unit. Outputs of the buffer units from BUFj to BUFn may be data voltages.

For example, an output terminal of a jth buffer unit BUFj may be coupled to a jth data line DLj, and receive a buffer power voltage VDD and a ground power voltage GND. The buffer power voltage VDD may determine an upper limit of an output voltage (i.e., a data voltage) of the buffer unit BUFj. In addition, the ground power voltage GND may determine a lower limit of the output voltage of the buffer unit BUFj. Other voltages instead of the buffer power voltage VDD and the ground power voltage GND may be further applied to the buffer unit BUFj according to a configuration of the buffer unit BUFj. The other voltages may be control voltages for determining a slew rate of the buffer unit BUFj. The control voltages are different from the buff power voltage VDD, in that the control voltages are not voltages for determining the upper limit or lower limit of the output voltage of the buffer unit BUFj. The buffer unit BUFj may generate an output voltage by amplifying an input voltage according to a gain value SSG.

The gain value SSG may be changed by the initial gain provider 16 and the gain provider 17 as described above.

In accordance with the present disclosure, the display device can reduce a flicker according to an image pattern while using the screen saver function.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A display device comprising:

a plurality of pixels commonly coupled to a first power line; and a current sensor configured to provide a sensing value of a current flowing in the first power line, wherein the pixels gradually decreases a luminance of a still image from a first time while the still image is being displayed, wherein the first time is a time when a first period elapses from a time at which the display of the still image is started, and wherein a length of the first period is changed depending on the sensing value at the time at which the display of the still image is started.

2. The display device of claim 1, wherein the first period becomes shorter as the sensing value becomes smaller.

3. The display device of claim 2, wherein the plurality of pixels maintain the luminance of the still image from a second time after the first time, and wherein an interval between the time at which the display of the still image is started and the second time is set longer as the sensing value at the time at which the display of the still image is started becomes smaller.

4. The display device of claim 3, wherein the pixels display a moving image at a third time after the second time, and gradually increase a luminance of the moving image from the third time.

5. The display device of claim 4, wherein an increase rate of the luminance of the moving image is determined according to a difference between a sensing value at the third time and the sensing value at the time at which the display of the still image is started.

6. The display device of claim 1, further comprising:

a gain provider configured to include a load comparator generating an enable signal when a difference between a load value of a first frame and a load value of a second frame is smaller than an enable threshold value, and configured to gradually decrease a gain value from the first time when the first period elapses, wherein the first period starts from a time at which the enable signal is generated to the first time, wherein the pixels receive data voltages determined by the gain value and input grayscale values, and wherein the gain provider determines a length of the first period according to a first load value based on the input grayscale values at the time at which the enable signal is generated.

7. The display device of claim 6, wherein the gain provider determines the first period to become shorter as the first load value becomes smaller.

8. The display device of claim 7, wherein the gain provider maintains the gain value from a second time after the first time.

9. The display device of claim 8, wherein an interval between the time at which the enable signal is generated and the second time is set constant regardless of the first load value.

10. The display device of claim 8, wherein an interval between the time at which the enable signal is generated and the second time is set longer as the first load value becomes smaller.

11. The display device of claim 8, wherein the gain provider includes:

a first frame counter configured to provide a first count value of frames from the time at which the enable signal is generated; and a set gain controller configured to determine the first period, based on the first load value and the first count value.

12. The display device of claim 11, wherein the set gain controller includes a plurality of set gain lookup tables different from each other according to the first load value.

13. The display device of claim 12, wherein the set gain controller provides a first gain ratio value corresponding to the first count value with reference to a set gain lookup table selected according to the first load value.

14. The display device of claim 13, further comprising:

an initial gain provider configured to provide an initial gain value based on the sensing value, wherein the gain provider further includes a gain converter configured to convert the initial gain value into the gain value according to the first gain ratio value.

15. The display device of claim 14, wherein the initial gain provider provides the initial gain value such that the sensing value is smaller than a current limit value, and wherein the first gain ratio value is equal to 1 or less than 1.

16. The display device of claim 15, wherein the gain provider gradually increases the gain value from a third time after the second time.

17. The display device of claim 16, wherein the gain provider determines an increase rate of the gain value according to a second load value based on the input grayscale values at the third time.

18. The display device of claim 17, wherein the gain provider determines an increase rate of the gain value according to a difference between the second load value and the first load value.

19. The display device of claim 17, wherein the load comparator generates a disable signal when a difference between a load value of a third frame and a load value of a fourth frame is greater than a disable threshold value, and wherein the gain provider includes:

a second frame counter configured to provide a second count value of frames from a time at which the disable signal is generated; and a reset gain controller configured to determine the increase rate based on the second load value and the second count value.

20. The display device of claim 19, wherein the reset gain controller includes a plurality of reset gain lookup tables different from each other according to the second load value.

21. The display device of claim 20, wherein the reset gain controller provides a second gain ratio value corresponding to the second count value with reference to a reset gain lookup table selected according to the second load value.

22. The display device of claim 21, wherein the gain converter converts the initial gain value into the gain value according to the second gain ratio value, and wherein the second gain ratio value is equal to 1 or less than 1.

* * * * *